United States Patent [19]
Graef et al.

[11] Patent Number: 4,835,343
[45] Date of Patent: May 30, 1989

[54] TWO PIECE FACE PLATE FOR WALL BOX MOUNTED DEVICE

[75] Inventors: John T. Graef, Kintnersville; Elliot G. Jacoby, Glenside; Joel S. Spira, Coopersburg, all of Pa.

[73] Assignee: Lutron Electronics Co., Inc., Coopersburg, Pa.

[21] Appl. No.: 32,484

[22] Filed: Mar. 30, 1987

[51] Int. Cl.⁴ .............................................. H02G 3/14
[52] U.S. Cl. ........................................ 174/66; 220/241
[58] Field of Search ................... 174/66, 67; 220/241, 220/242; 439/536

[56] References Cited

U.S. PATENT DOCUMENTS

| | | | |
|---|---|---|---|
| 2,740,873 | 4/1956 | Cronk | 174/66 X |
| 3,197,549 | 7/1965 | Good | 220/241 X |
| 3,735,020 | 5/1973 | Licata | 174/66 |
| 3,908,235 | 9/1975 | Telliard | 174/66 X |

*Primary Examiner*—A. T. Grimley
*Assistant Examiner*—David A. Tone
*Attorney, Agent, or Firm*—Ostrolenk, Faber, Gerb & Soffen

[57] ABSTRACT

A two piece face plate for wall mounted devices having a rectangular escutcheon is disclosed. An adapter plate having the length and width of the wall box opening is connected to the yoke of a wall box mounted device at the screw openings in the yoke plate reserved for the connection of the wall plate. Snap receiving openings are contained in the adapter plate. A decorative wall plate, which is free of mounting screw openings, has projecting snaps which project into the snap openings in the adapter plate. An internal flange extending from the wall plate produces a shadow around the periphery of the wall plate relative to the wall in which the switch is mounted. A plural gang wall box is disclosed which receives respective devices and respective adaptor plates. A common wall plate is snapped into position relative to all adapter plates.

43 Claims, 9 Drawing Sheets

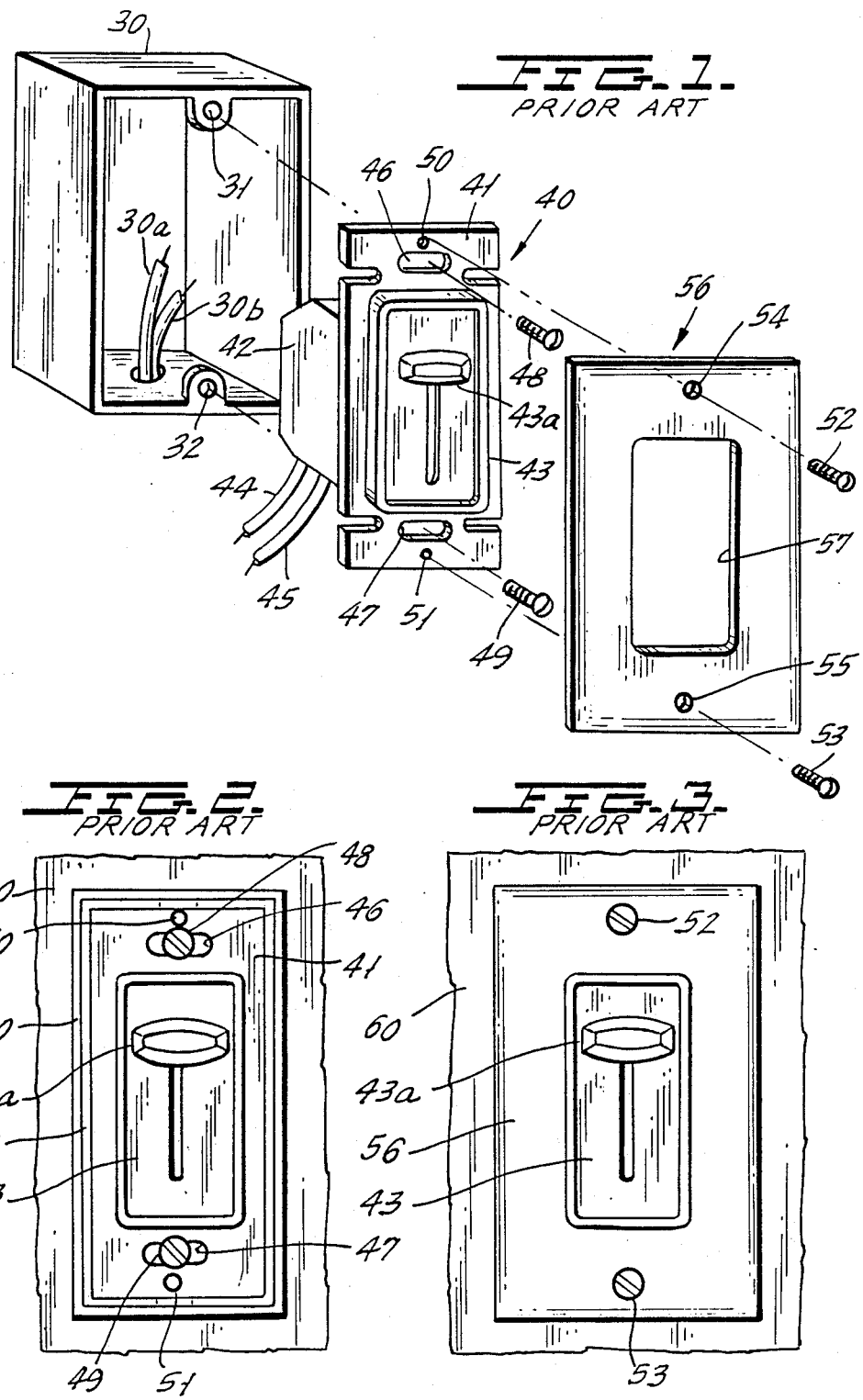

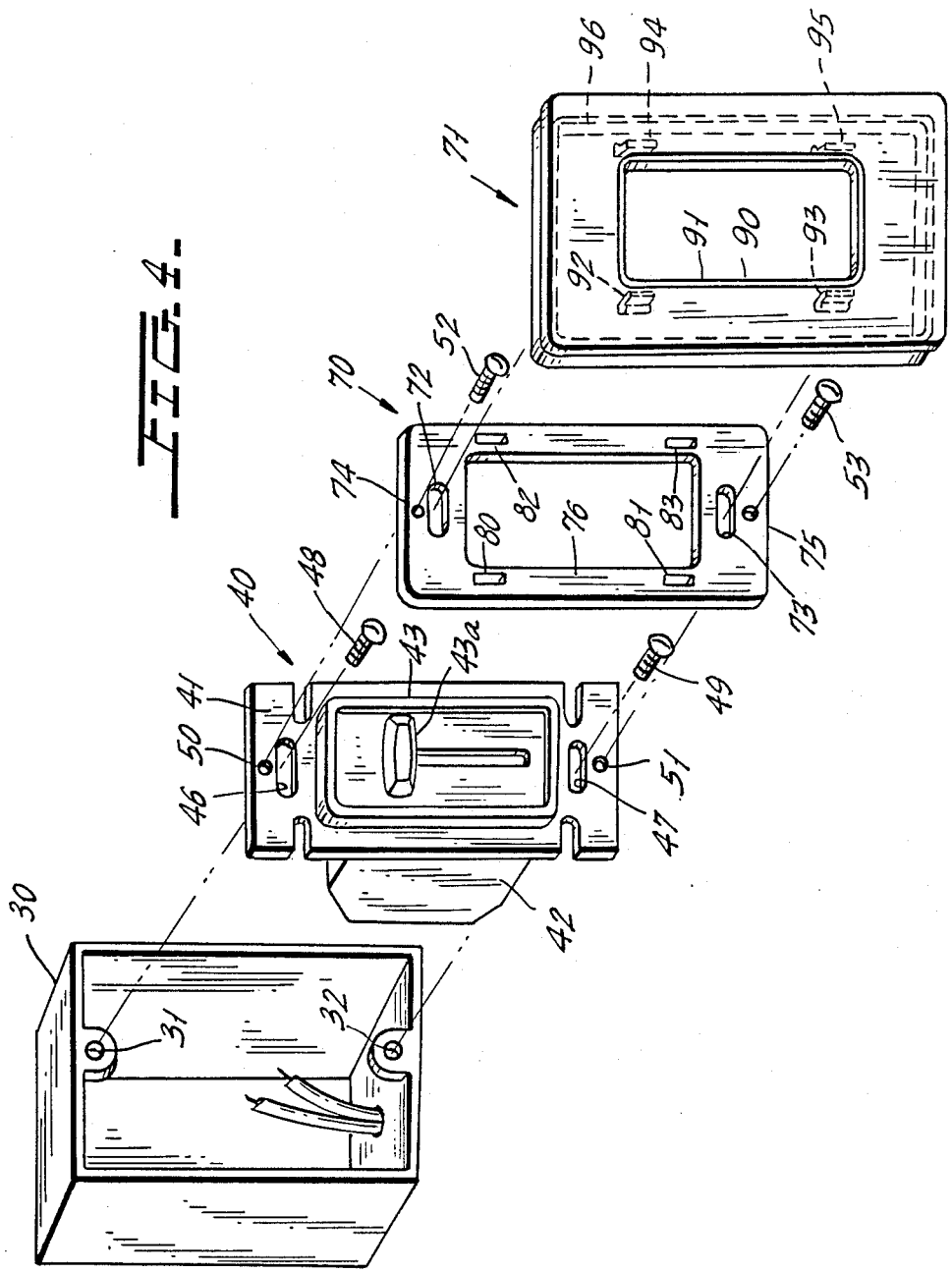

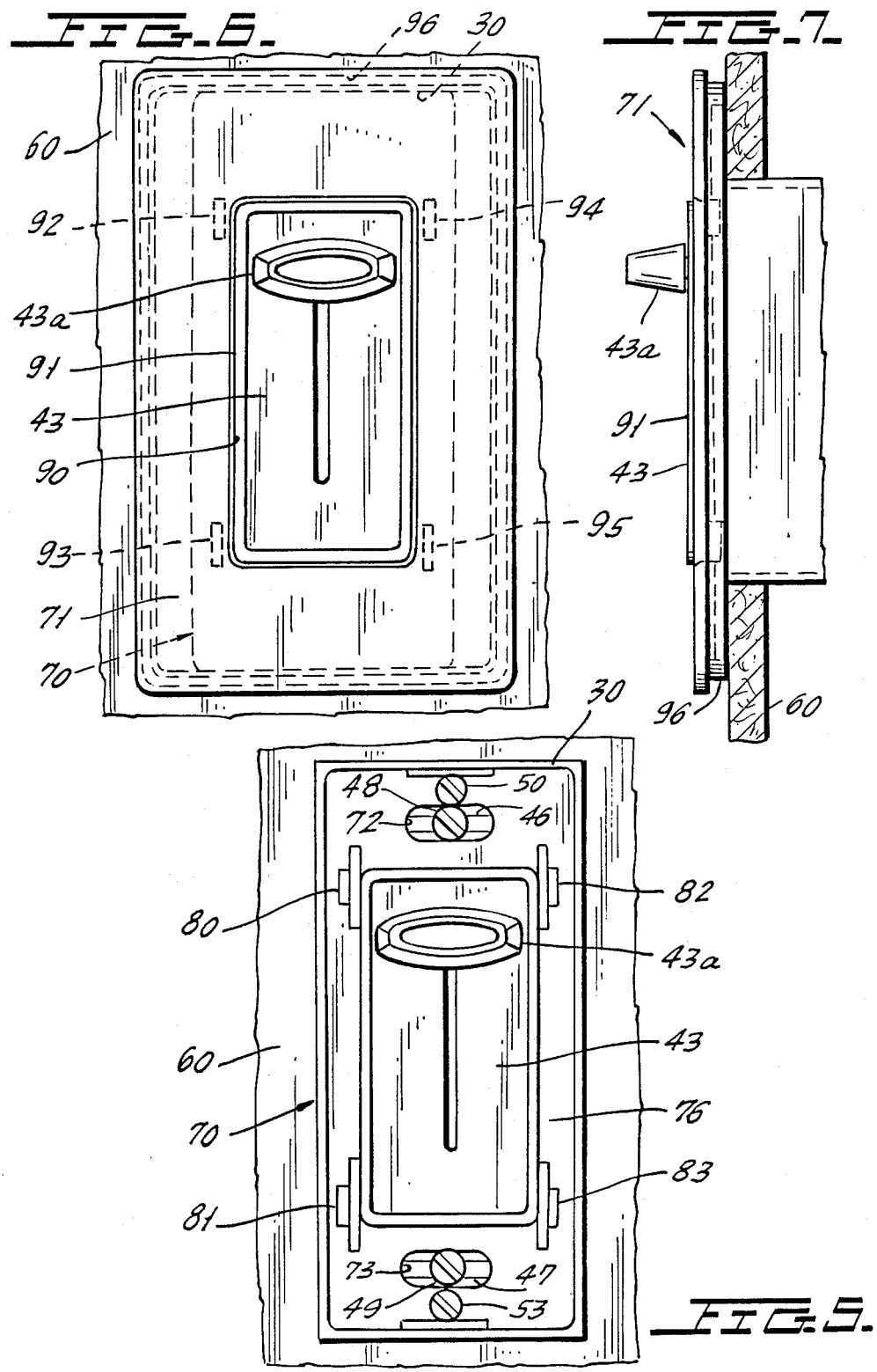

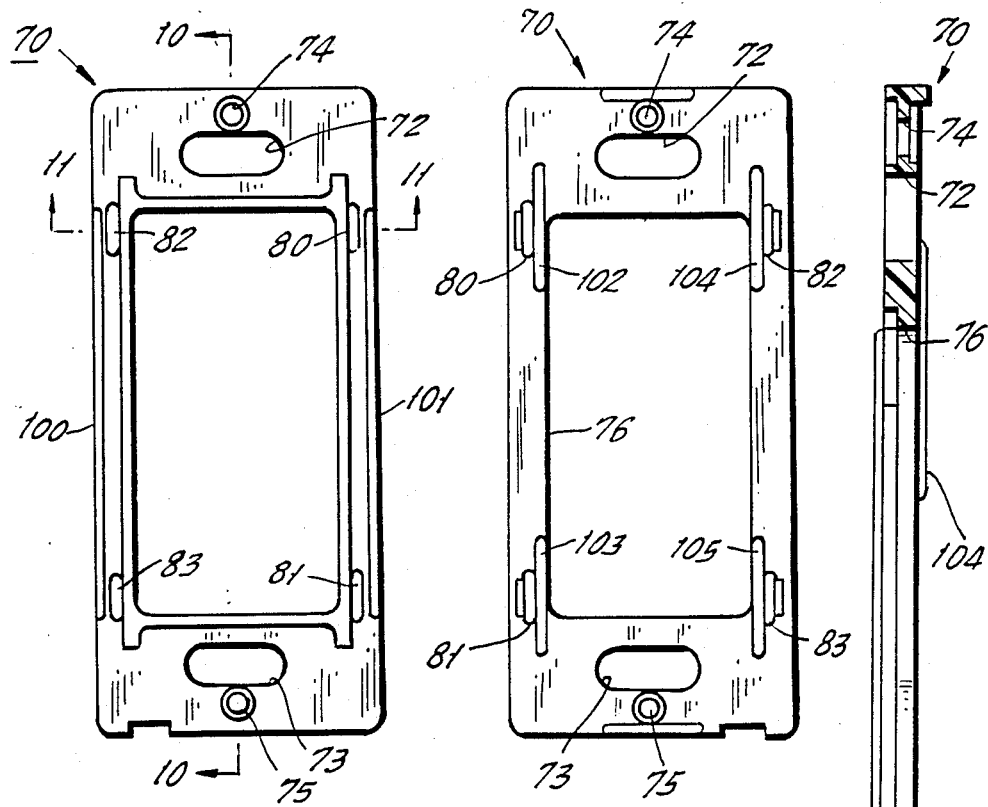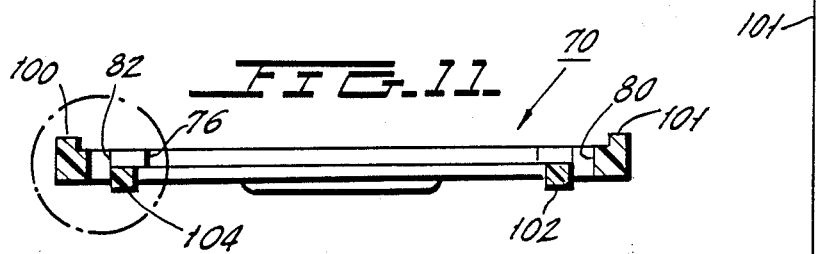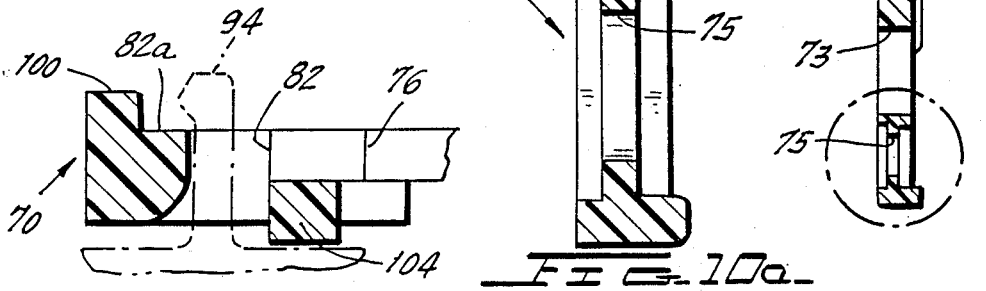

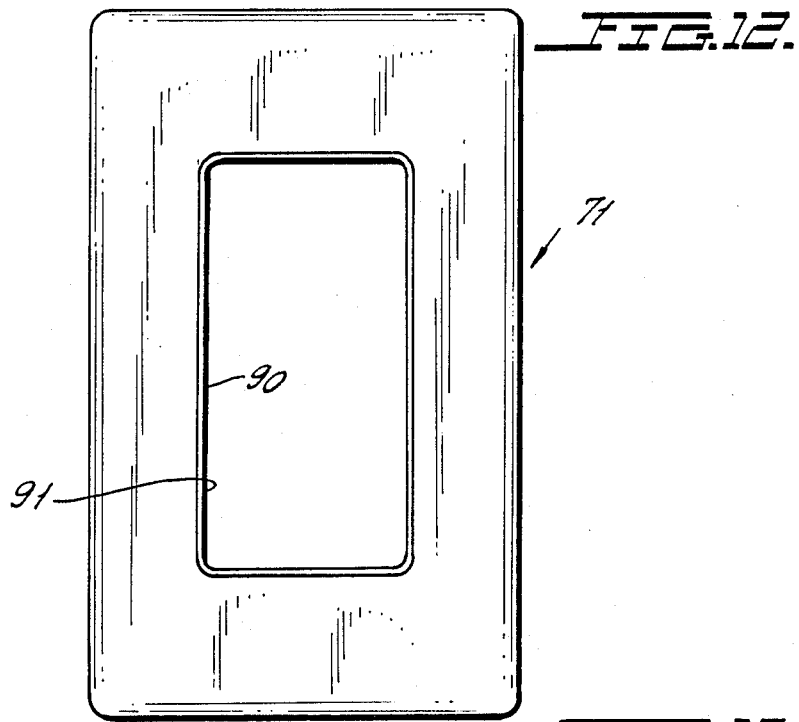
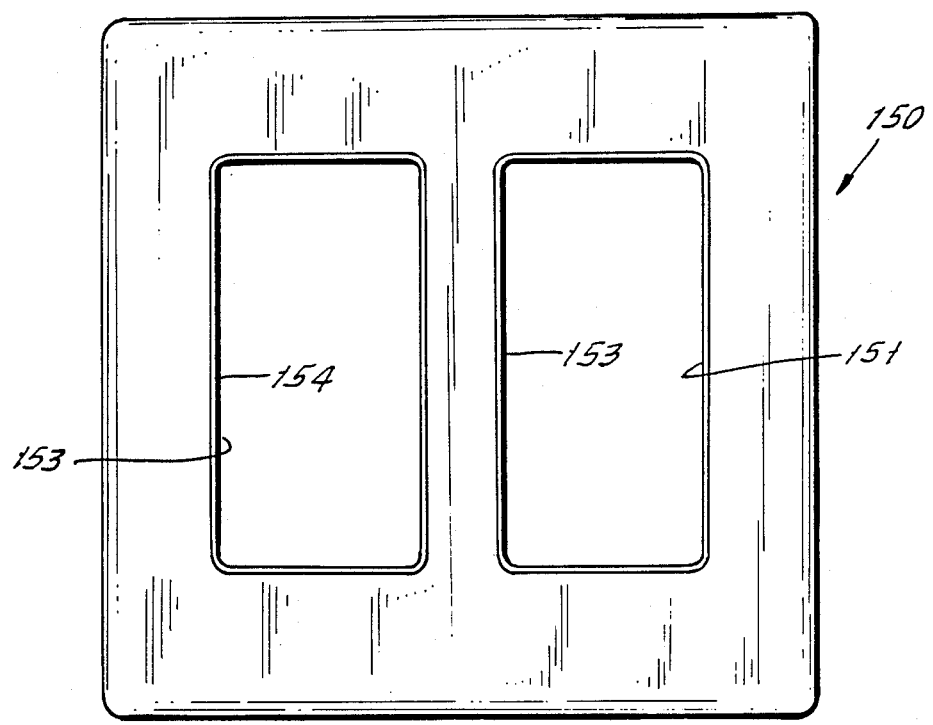

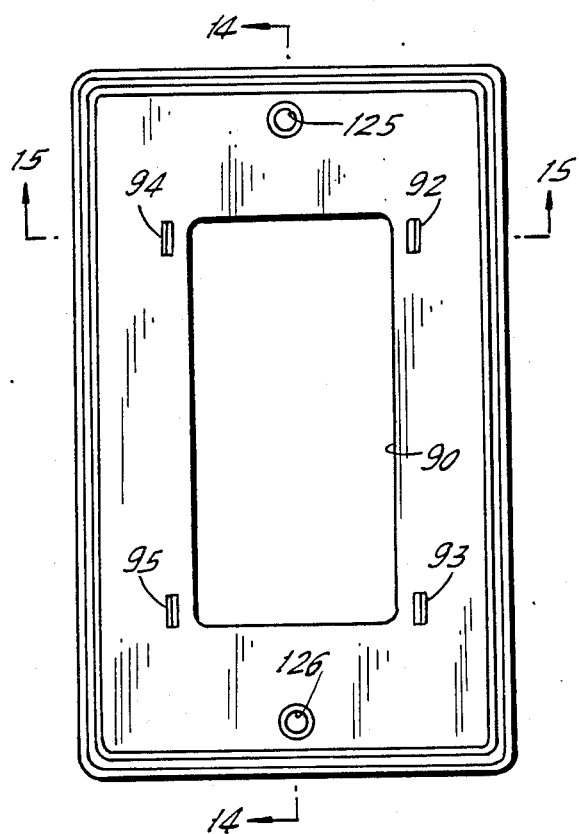
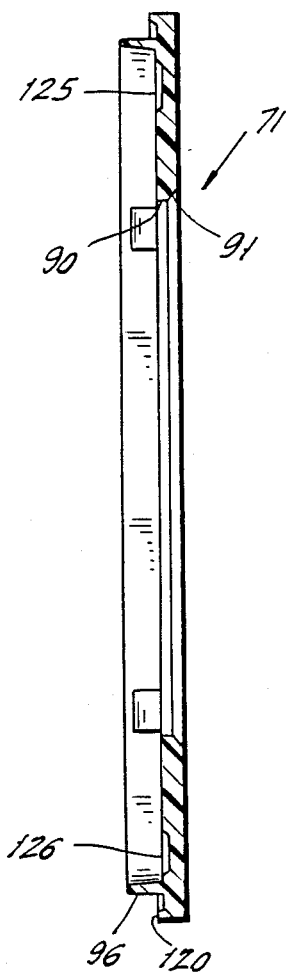
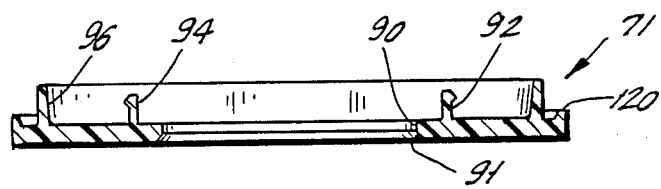

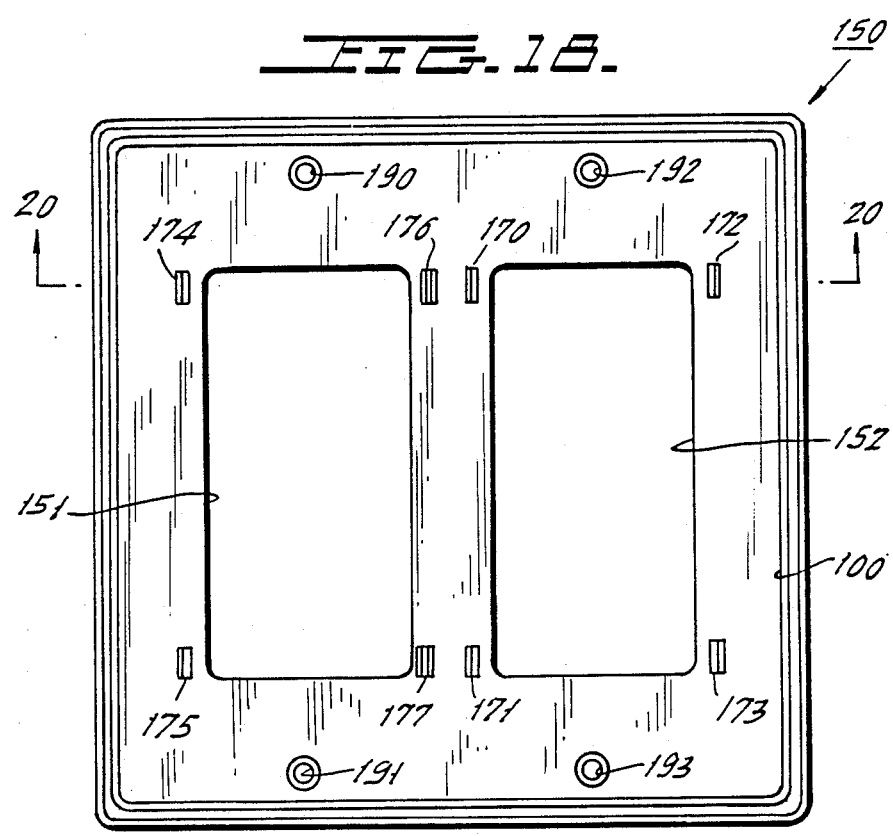
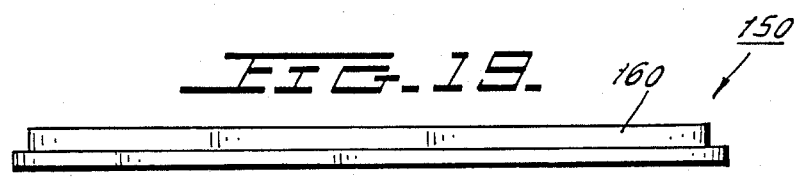
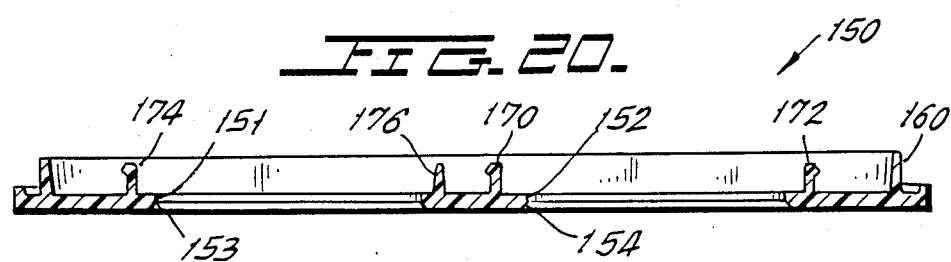

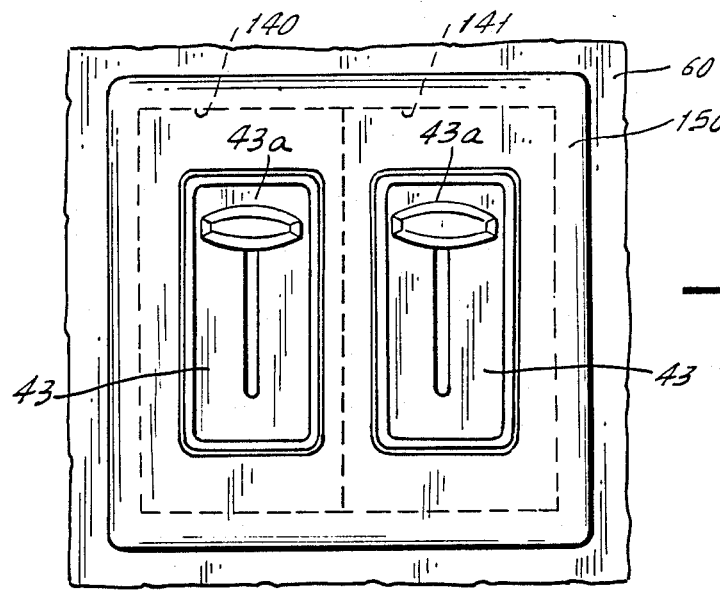
FIG. 24.
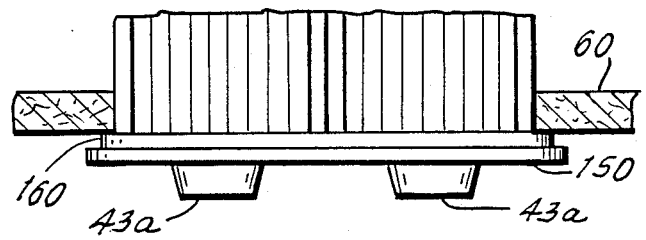
FIG. 25.
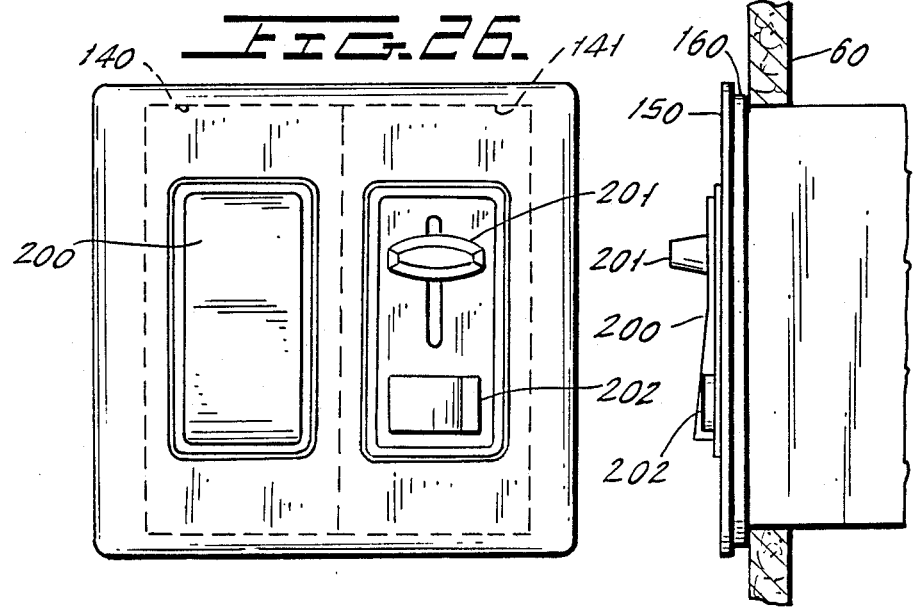
FIG. 26.
FIG. 27.

TWO PIECE FACE PLATE FOR WALL BOX MOUNTED DEVICE

BACKGROUND OF THE INVENTION

This invention relates to a novel cover for a wall box mounted switch, receptacle, display or other device of the type which employs an integral yoke plate having a shallow insulation escutcheon protruding from one surface thereof, which escutcheon can contain an operating member which is externally operable from a position in front of the wall box and more specifically relates to a novel two part cover plate.

Wall box mounted devices and switches are well known. The term "switch" as used herein is intended to encompass devices employing on/off contacts and/or dimming controls. The on/off contact may be employed as the sole control means of the switch and may be manually operable by a toggle. The device may also employ a dimmer control such as a rotary or longitudinally movable adjustment device which operates with or without an on/off switch. One known switch is sold by Lutron Electronics Co., Inc., the assignee of the present invention, under its trademark "SKYLARK".

One SKYLARK switch device employs a linearly movable control member which causes a dimming function and operates an on/off switch at the end of its longitudinal motion. In another SKYLARK switch model, the on/off switch is a toggle switch which operates independently of the slide dimmer control so that the switch can be turned on and off without changing the dimmer setting.

The dimmer slide of the SKYLARK switch devices is contained within an elongated rectangular escutcheon which extends from the front surface of the yoke plate. A conventional back box containing the switch mechanism extends from the rear surface of the yoke plate. A pair of flexible leads extend through the back box to be electrically connected to wiring contained within the wall box within which the device is mounted.

The switch referred to above is but one of a large number of known devices which contain a rectangular escutcheon extending from the front surface of the yoke plate. In some, the entire front of the escutcheon contains a single toggle switch operator or outlet socket. Devices of this class are identified by NEMA Standards Publication No. WD6-1983, page 6, which discloses the NEMA rectangular face device with an escutcheon projecting from the front of a yoke plate.

The yoke plate of such devices has a pair of laterally extended openings slightly removed from the top and bottom of the escutcheon, which openings receive standard mounting screws which are positioned to thread into threaded openings in a standard wall box. That is, the center-to-center spacing of the laterally extended openings in the yoke plate is the same as the center-to-center spacing of the screw receiving openings in a wall box.

A second pair of openings are disposed above and below the two mounting openings respectively. These latter two openings are threaded and are on a spacing equal to that of the openings in a wall plate which is adapted to cover the yoke plate and escutcheon of the device and to be held in place by screws. The spacing of these openings is standard so that any manufacturer's wall plate can be connected to and cover any manufacturer's device. The threaded openings are adapted to receive 6–32 screws on a standardized center-to-center distance of 3.812 inches.

The purpose of the wall plate is to provide a decorative cover for the front of the escutcheon and yoke plate, as well as to prevent access to the interior of the wall box which contains electrical wiring. Standard wall plates have central openings large enough to receive the device escutcheon. However, the screw heads which mount the cover plate to the device are visible at the cover plate surface, thus giving the surface a cluttered appearance. Furthermore, when the wall plate is removed, either intentionally or accidentally, it is possible frequently for a person to gain access to the interior of the wall box due to uncovered openings between the edges of the yoke plate and the sides of the wall box. This creates a dangerous situation, particularly to children who are unaware of the danger and may poke foreign objects into the wall box or even put their fingers into the wall box.

Custom face plates have been manufactured and are available for use with only one switch wherein the custom wall plate can be snapped onto its respective switch. Both the yoke plate for the switch and the cover must be made with surface snaps in cooperating locations. The custom wall plate cannot be used with any other switch. One device of this type is device model No. NK09051T, sold by National. This device does not have the standard escutcheon size set forth in the NEMA Standard Publication No. WD6-1983, page 6. Obviously, the wall plate supplied with the device is not interchangeable with other rectangular face devices. Moreover, if the wall plate is removed, interior wiring may be accessed, leading to potentially dangerous situations, particularly since the wall plate can be removed without special tools.

Another custom wall plate device is known, sold by National, under number NK09080. This device employs a two-piece face plate assembly for a switch of non-NEMA standard configuration. That is, this switch has a front escutcheon which is longer than the NEMA standard and has a width less than the NEMA standard value. The device has a wide frame plate which is intended to overlap the wall surrounding the wall opening for the wall box and defines an outer decorative finish. This frame is screwed into place in the screw hole openings in the device yoke plate which are intended to receive a decorative plate. However, a very large, central opening is formed in the frame so that a gap exists between the edges of the metal yoke plate and the interior of the frame opening. A narrow decorative plate is then snapped over the escutcheon and into snap receiving openings within the outer frame. Again, this decorative plate can be removed without use of special tools and, when removed, exposes a dangerous gap between the frame and the yoke plate of the switching device, which exposes the wiring within the wall box.

Decorative plates are also known for conventional toggle switches in which the operating handle protrudes through a relatively small rectangular opening. These switches do not employ an insulation escutcheon extending from the front of the yoke plate. These devices, which are sold by Edmar Creations Inc. of Clifton, N.J., employ a large area clear plastic frame which is screwed into a wall box and overlaps the wall opening. A decorative cover is then snapped into a recessed front surface of the clear plastic frame. The screws for mounting the device to the wall box are on centers inappropriate for the mounting of a switch of the type having a NEMA extending escutcheon, and the opening of these devices cannot receive the escutcheon of such a device. Moreover, the device presents a relatively wide plastic frame enclosing the wall box opening.

Another prior art structure is that of U.S. Pat. No. 2,740,873 in the name of K. P. Cronk. The device shown in that patent employs a custom snap-in plate which is adapted to snap into a specially prepared yoke plate for the switch mechanism. The yoke plate is a custom yoke plate which is adapted to mount and carry the switch mechanism and to connect the switch mechanism to the wall box. Consequently, the decorative plate of Cronk fits only the customized yoke plate and cannot be used for other switch structures.

BRIEF DESCRIPTION OF THE INVENTION

The present invention provides a novel two piece face plate arrangement consisting of a hidden adapter plate and an outer wall plate. The adapter plate has a rectangular opening which receives the protruding escutcheon extending from the front of the yoke plate of any standard switch device. The adapter plate has a width equal to the width of a standard wall box and is fixed across the wall box opening by screws threaded into the standard 6-32 mounting holes in the device yoke. The adapter plate is preferably a generally flat molded insulation plastic plate and has enlarged openings in locations adjacent the mounting screw receiving openings in the wall box. Thus, if mounting screws which fix the yoke plate to the wall box project above the surface of the yoke plate, the heads of the mounting screws are received in the adapter plate clearance openings and the adapter plate can still fit flush on the yoke plate.

The adapter plate also contains snap openings for receiving corresponding snaps which extend from the interior surface of the wall cover plate, as will be later described. Four openings are also provided adjacent respective corners of a rectangle. Each opening is provided with an adjacent reinforcement ridge and a curved surface for improving the snap connection of a cooperating snap on the wall plate. The interior surface of the adapter relative to the wall box has a standoff which permits the interior surface of the snap opening to be raised above the plane of the exterior surface of the yoke plate so that easy snap action can occur during the connection of the wall plate to the adapter plate.

By making the width of the adapter plate equal to the width of a wall box, it is possible to mount any desired number of adapter plates on a multi-gang wall box and insure a continuous front closure for the wall box opening.

The wall plate, which snaps onto the adapter plate, has a central opening aligned to the central opening of the adapter plate for receiving the switch or other device escutcheon. The wall plate has projecting snap connectors which are aligned with the openings in the adapter plate. The wall plate has a smooth, continuous surface which presents an extremely attractive ornamental appearance when snapped in position on its adapter. Moreover, the wall plate has an interior raised flange about its periphery but removed by a short distance from the outer edge of the wall plate to define an annular surface removed from the outer edge of the wall place. When the wall plate is in place on the wall box, the flange produces a shadow effect and gives the appearance of a floating cover which is slightly removed from the plane of the wall. The peripheral flange also provides a good seal about the periphery of the wall adjacent the opening to the wall box to discourage attempts to remove the face plate from the wall box.

If desired, the wall plate may have several rectangular openings therein for receiving ganged switches in a multi-gang box. However, the same basic structure wall plate is employed as that described above.

Both the wall plate and adapter plate of the present invention have the standard NEMA rectangular face device opening and can be attached to any switch using this standard opening and having the standardized 6-32 mounting holes in the switch yoke. If the wall plate of the novel two piece plate configuration is removed, as by a child or vandal, the adapter plate remains screwed in place and covers the entire space between the switch device and the entry opening of the wall box. Thus, even with the wall plate removed, access to the live leads of the device, either by a child's fingers or foreign objects, is prevented. Moreover, the wall plate presents an extremely attractive finished appearance to the switch in either a single gang or multiple gang size, and presents a face plate with an extremely "clean" appearance which does not display mounting screws or any other feature to view.

BRIEF DESCRIPTION OF THE DRAWINGS

FIG. 1 is an exploded perspective view of a prior art dimmer switch, the wall box therefor and the decorative face plate.

FIG. 2 is an elevation view of the switch of FIG. 1 when mounted into the wall box.

FIG. 3 shows the device of FIG. 2 after the wall plate is connected in position.

FIG. 4 is an exploded perspective view of a prior art switch and wall box therefor in combination with the novel two piece face plate of the present invention.

FIG. 5 shows the wall box switch and adapter plate of FIG. 4 mounted in position on a wall.

FIG. 6 shows the arrangement of FIG. 5 after the wall plate is snapped in place.

FIG. 7 is a side elevation view of the device of FIG. 6 and shows the floating effect of the wall plate relative to the wall.

FIG. 8 is an elevation view of a preferred embodiment of the adapter plate of the invention and shows the surface which is mounted in contact with a wall box opening.

FIG. 9 is a rear view of FIG. 8.

FIG. 10 is a cross sectional view of FIG. 8 taken across the section line 10—10 in FIG. 8.

FIG. 10a is an enlarged view of the circled area of FIG. 10.

FIG. 11 is a cross sectional view of FIG. 8 taken across the section line 11—11 in FIG. 8.

FIG. 11a is an enlarged view of the circled area shown in FIG. 11.

FIG. 12 is a front elevational view of the wall plate portion of the two piece face plate of the present invention, in combination with the adapter plate of FIGS. 8-11.

FIG. 13 is a rear view of FIG. 12.

FIG. 14 is a cross sectional view of FIG. 13 taken across the section line 14—14 in FIG. 13.

FIG. 15 is a cross sectional view of FIG. 13 taken across the section line 15—15 in FIG. 13.

FIG. 16 is a bottom view of FIG. 13.

FIG. 17 shows a second embodiment of the wall plate of the present invention for use with a double-ganged wall box.

FIG. 18 is a rear view of FIG. 17.

FIG. 19 is a bottom view of FIG. 18.

FIG. 20 is a cross sectional view of FIG. 18 taken across the section line 20—20 in FIG. 18.

FIG. 24 shows the snap connection of the wall plate of FIGS. 17–20 in place on the assembly of FIG. 23.

FIG. 25 is a top view of FIG. 24 to illustrate the floating wall plate appearance produced by the novel invention.

FIG. 26 is an elevation view of a dual wall box receiving two diverse switch devices, one a toggle and the other a preset dimmer.

FIG. 27 is a side elevation view of FIG. 26 to illustrate the relative positions of the toggle and dimmer controls as well as the floating effect displayed by the wall plate of the invention.

DETAILED DESCRIPTION OF THE DRAWINGS

Figure 21:
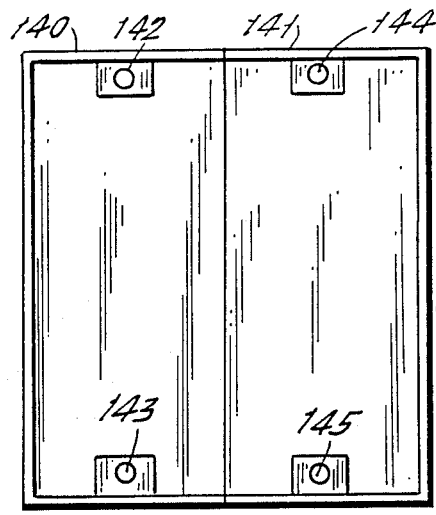
FIG. 21 is a front elevation view of a double-ganged wall box.

Referring first to FIG. 1, there is shown a conventional metal wall box 30 which is adapted to be mounted within the wall of a building. The wall box opening is flush with the surface of the wall and provides a metallic enclosure to receive a switch device. Other wall boxes can be used in connection with the invention, including wall boxes having insulation body portions.

Wall box 30 has "knock-outs" which permit the introduction of electrical wiring which extends through the building walls, shown as the wires 30a and 30b in FIG. 1. Wires 30a and 30b are part of the building wiring and can be connected to lamp loads or the like which are to be controlled by a switching device. Wall box 30 is also provided with threaded mounting openings 31 and 32 which are on standard centers and are adapted to receive mounting screws for mounting a switching device within the wall box 30.

Switching device 40 of FIG. 1 is of the type employing a dimmer control. More specifically, switch device 40 is a dimmer manufactured by Lutron Electronics Co., Inc. under its trademark "SKYLARK". Switch device 40 consists of a metallic yoke plate 41 having an insulation back box 42 on its rear surface and a rectangular insulation escutcheon 43 extending from its front surface. The insulation escutcheon 43 is not more than 2.62 inches long by 1.30 inches wide which are standard dimensions set by NEMA standards previously described. The escutcheon 43 extends above the surface of yoke 41 by about 0.32 inches.

A manually operable slider (FIG. 1) has a slider handle 43a projecting beyond the front surface of escutcheon 43. Movement of the handle 43a between its end positions will cause dimming of the lighting load and, when reaching the downwardmost position, will cause the opening of a switch which is electrically in series with wires 44 and 45 to cause a positive turn off of the lighting load circuit.

Back box 42 encloses the switching mechanism which is employed for the device 40 and insulates it from accidental contact with wires or grounds within the wall box 30. Two leads 44 and 45 extend through an opening in the back box 42 (not shown) and may be connected to the wiring 30a and 30b when the switch device 40 is connected within the wall box.

The yoke plate 40, which preferably is a generally flat thin metal stamping, is of conventional structure and has two laterally elongated openings 46 and 47 for receiving mounting screws 48 and 49. Screws 48 and 49 pass through openings 46 and 47 respectively and are threaded into openings 31 and 32 respectively in wall box 30 in order to mount the switch device 40 to the wall box 30 as shown in FIG. 2.

The yoke 41 is provided with threaded openings 50 and 51 which are on standard centers and receive screws 52 and 53 which extend through respective openings 54 and 55 in the wall plate 56.

Wall plate 56 is a standard wall plate having a rectangular opening 57 which is dimensioned to fit over the standard size escutcheon 43. Preferably, when the wall plate 56 is in place, the outer surface of escutcheon 43 will be flush with the outer surface of the wall plate 56. This desired condition, however, does not always occur due to misalignment of the wall box 30 relative to the wall 60 in which it is mounted (FIGS. 2 and 3).

Several problems exist with the prior art arrangement of FIGS. 1, 2 and 3. First, as will be apparent from FIG. 3, the screws 52 and 53 are in view and present a cluttered appearance to the eye of the observer. From a safety point of view, when plate 56 is removed it may be possible to gain access by one's fingers or with foreign objects to the wiring within wall box 30 through the gap 61 in FIG. 2 between the periphery of the wall plate 41 and the wall box 30. This is especially dangerous to small children.

The present invention provides a novel two piece plate structure which produces both a novel ornamental appearance for the switch after it is mounted and prevents the possibility of access to the interior of the wall box when the decorative wall plate portion is removed. As will be further seen, the novel invention also permits the novel ganging of adapter plates in a multiganged wall box, and the use of a common wall plate for the ganged assemblage.

FIG. 4 shows an exploded perspective view of the device of the present invention when applied to the same switch device of FIGS. 1, 2 and 3. In accordance with the invention, the single wall plate 56 of the prior art is replaced by a combined adapter plate portion 70 and wall plate portion 71, as shown in FIG. 4. The adapter plate 70 and wall plate 71 are both preferably molded plastic parts although they could be made of any desired material by any desired process.

The details of the structure of adapter plate 70 are shown in FIGS. 8 through 11 which are later described. In general, however, and as shown in FIGS. 4 through 7, the adapter plate is a generally flat plate having enlarged laterally elongated openings 72 and 73 which are sufficiently large to receive the protruding heads of screws 48 and 49 after those screws are screwed into place with respect to wall box 30. Adapter plate 70 further contains two openings 74 and 75 which receive screws 52 and 53 respectively which thread into tapped openings 50 and 51 in the switch 40 in order to hold the adapter plate onto the surface of switch 40.

FIG. 5 shows the adapter plate in position over the wall box 30. Note specifically that the adapter plate 70 has a width equal to the full width of the opening in wall box 30 so that when it is screwed in place, the entire wall box opening is sealed against access from regions exterior to the wall box even if such access is permitted by the width of yoke plate 41. Note further that since openings 74 and 75 are on the standard centers of threaded openings 50 and 51, the adapter can be connected to any type device employing the standard size escutcheon 43.

Adapter plate 70 has an opening 76 which is sufficiently large to receive the escutcheon 43 within the maximum tolerance limitations of such escutcheons. Adapter plate 70 is then formed with four openings, 80, 81, 82 and 83, which are adapted to receive cooperative snaps extending from the wall plate 71 as will be later described. As will be later described, the openings 80 through 83 are countersunk from the surface of yoke plate 41 to enable the reception of the protruding and cooperating snaps from the wall plate 71.

When the adapter plate is in position as is shown in FIG. 5, it enables snap connection to the wall plate 71. Wall plate 71, as stated previously, is preferably a molded plastic member and has the structure shown in more detail in FIGS. 12 through 16, which will be later described. In general, however, and as shown in FIGS. 4, 6 and 7, the wall plate 71 has a rectangular opening 90 which fits over the escutcheon 43. The opening 90 contains a chamfer around its periphery at its front surface, shown as the chamfer 91. This chamfer masks appearance differences due to different depths of penetration of the escutcheon 43 into the opening 90 for different wall box assemblies. Preferably, the flat outer surface of escutcheon 43 should be coplanar with the outer surface of plate 71. This, however, does not occur in practice because of dimensional variations and because of the variable positioning of the switch 40 within the wall box 30. The chamfer 91 tends to mask such differences in the escutcheon penetration depth.

In accordance with an important feature of the invention, the rear surface of wall plate 70 contains four plastic snap connectors 92, 93, 94 and 95, which are elongated pedestals adapted to penetrate openings 80 to 83 respectively and then snap behind the opening. The details of the snap construction will be later described.

Another significant feature of the structure of the wall plate 71 is the absence of screws from its surface (the mounting screws 52, 53, 48 and 49 are masked from view by the plate 31) and by an annular flange 96 which is integral with the plate 71. The flange 96 has a depth of about ¼ inch and encloses a rectangular area having a length and width greater than the length and width respectively of the opening into wall box 30. Thus, the flange engages the wall surface, enclosing the wall box opening as shown in FIG. 7. The outer periphery of the wall plate 71 overhangs the annular flange 96 so that when the cover is mounted in position, the cover portion overhanging flange 96 produces a shadow effect so that, to the eye of the observer, the cover 71 seems to be floating slightly above the wall surface.

FIGS. 8, 9, 10, 10a, 11 and 11a describe a preferred embodiment of the adapter plate 70 and are now described in detail. The same features which were disclosed in FIGS. 4 through 7 have the same identifying numerals.

Plate 70 is molded of any desired flame retardant plastic. A preferred material is a thermoplastic polyester resin manufactured by Du Pont under the trademark "RYNITE FR-530". The plate has a total height of about 4.13 inches and a total width of about 1.8 inches. The opening 76 is symmetrically located within the plate and has a width of about 1.315 inches and a height of about 2.62 inches. This will enable the adapter plate to fit over any standard escutcheon of a standard switch device. The plate has a total thickness of about 0.15 inches.

Openings 72 and 73 have a noncritical height which is sufficient to clear the heads of the screws 48 and 49 (FIGS. 4 and 5) so that the interior surface of the adapter (shown in FIG. 8) can fit against the outer surface of the yoke plate 41 of FIG. 4. The snap openings 80 to 83 are disposed generally at the corners of the rectangular opening 76. Strengthening ribs 100 and 101 shown, in FIGS. 8, 11 and 11a, extend along the interior edges of adapter plate 70. The exterior side of plate 70 contains four standoff ribs 102, 103, 104 and 105 respectively, which extend along and inside of openings 82, 83, 80 and 81 respectively. (FIGS. 9, 10, 10a, 11 and 11a.) Standoffs or ribs 102 through 105 also increase the strength of the adapter plate 70 in the area of the holes 80 through 83.

Each of openings 80 through 83 have the configuration best shown in FIGS. 11 and 11a for the opening 82. Thus, it is seen that on the exterior surface the opening 82 has an outer radius, for example of about 0.100 inches with a standoff of about 0.20 inches to enable latching of the snap projections of the wall plate which will be later described. Openings 74 and 75 have countersunk portions which receive the heads of the mounting screws 52 and 53 of FIGS. 4 and 5.

Reference is made next to FIGS. 12-15 which show the details of a preferred embodiment of the wall plate 71 for a single gang arrangement such as that shown in FIGS. 4, 6 and 7. In the preferred embodiment of the invention, plate 71 is made of a flame retardant plastic. Flame retardant ABS (Borg-Warner, CYCOLAC, KJB grade) has been used.

In the preferred device, the snaps or projections 92 through 95 are geometrically located to cooperate with the openings 80 through 83 respectively in the adapter plate of FIGS. 8-11. These projections have a length of about 0.148 inches and have outwardly flanged ends which engage and are cammed by the rounded surface of the openings such as the rounded surface shown in FIG. 11 for opening 80. The projections are then cammed inwardly relatively to one another and then snap outwardly over respective upper ledges on the upper surface of FIG. 11. A typical ledge is shown as ledge 82a in FIG. 11a which receives the projection 94 shown in dotted lines in FIG. 11a. Projections 92 through 95 may have a thickness of about 0.037 inches and a width, for example, of 0.200 inches.

The outer periphery of wall plate 71, as best seen in FIGS. 13, 14 and 15, has a short flange 120 which assists in producing a shadow effect when the plate is mounted to the wall as shown in FIG. 7. The lip of flange 120 has a height above the interior surface of member 71 of about 0.035 inches. The body thickness of the cover is about 0.060 inches. The height of the flange 96 above the interior surface of the body of the wall plate 91 is about 0.190 inches. These dimensions ave been used in one embodiment of the invention. Other dimensions can be used.

FIG. 16 shows the novel wall plate 71 when seen on edge and shows the flange 96 set in from the edge of the flat surface of the wall plate In particular, the flange 96 is spaced from the outer edge of the cover by about 0.12 inches. The molded wall plate 71 also contains countersunk openings 125 and 126 on its interior surface, shown in FIGS. 13 and 14. These countersunk regions, which may have a depth of about 0.035 inches, provide clearance for the heads of mounting screws 52 and 53 of FIGS. 4 and 5 and enable the flush connection of the wall plate 71 to the adapter plate 70.

Figure 22:
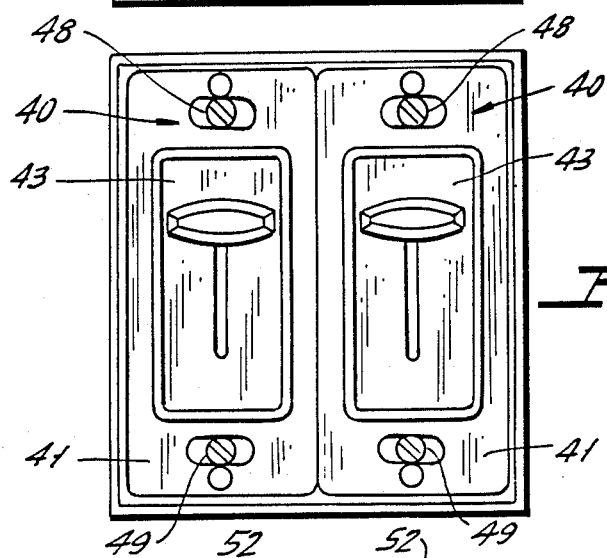
FIG. 22 shows two switching devices of the type having rectangular projecting escutcheons screwed into place in the dual wall box of FIG. 21.

FIGS. 17 through 20 show a second embodiment of a wall plate for use in connection with the present invention in which the wall plate can be used for ganged wall box configurations. More specifically, as shown in FIG. 21, it is known that wall boxes can be made in multiple sizes, a double sized wall box being shown. This double wall box consists of two wall boxes 140 and 141 which are ganged together to form a double sized chamber compared to that shown in FIG. 1. Each of the wall box sections 140 and 141 have respective mounting screw pairs 142-143 and 144-145 respectively. As shown in FIG. 22, two switching devices 40 can be connected within the double gang box by the mounting screws 48 and 49.

In accordance with the present invention, two adapter plates 70, each of the type shown in FIGS. 8 through 11, are gang-connected in place by the mounting screws 52 and 53 to a respective half of the double gang wall box. Since each plate 70 has the same width and height as that of a single wall box, the entire double wall box opening is closed by the two plates which butt against one another.

A dual wall plate 150, the details of which are described in connection with FIGS. 17 to 20, is then snapped onto the adapter plates 70 in FIG. 23 as shown in FIGS. 24 and 25.

As shown in FIGS. 17, 18, 19, 20, 24 and 25, the wall plate 150 has two openings 151 and 152, each identical in size to the opening 90 of FIGS. 4, 6, 12 and 13. Each opening 151 and 152 contains a chamfered edge 153 and 154 respectively (FIGS. 17 and 20). Cover 150 also has a peripheral flange 160 (FIGS. 18, 19, 20 and 25) to provide the shadow effect previously described in connection with the single wall box cover of FIGS. 12-16.

It is necessary for the cover of FIGS. 17 through 20 to make a snap fit into at least selected ones of the eight snap receiving openings by the two adapter plates 70 (the two sets of openings 80 through 83 in FIG. 23) in order to hold the cover in position. As shown in FIGS. 18 and 20, four snap projections 170, 171, 172 and 173 are located at the corners of the opening 152 in the manner of the single wall box plate shown in FIGS. 13 and 15. The corners of the other opening 151, however, are provided with only two snap projections 174 and 175, while the position of the other set of snap openings is occupied by thin projections 176 and 177, which act as locators to locate the plate 150 relative to the two adapter plates 70 of FIG. 23 before snapping it in place. More specifically, the projections 176 and 177 will fit into the right hand set of openings 81 and 80 respectively in FIG. 23. The remaining six projections or pins are used to support the cover relative to the adapter plate.

Figure 23:
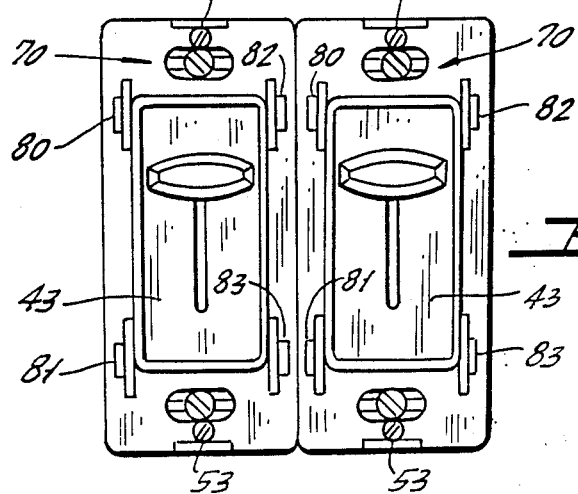
FIG. 23 shows two adapter plates of the type shown in FIGS. 8–11 fastened into place on the switch devices of FIG. 22.

Note also in FIG. 18 the use of countersunk openings 190 to 193 which are clearance depressions for receiving the heads of screws 52 and of screws 53 in FIG. 23.

The wall plate 150 is easily snapped into place over the assembly of FIG. 23, so that the plate, as shown in FIG. 24, receives escutcheons 43 and is held in place relative to the wall 60 with the flange 160 causing a slight standoff of the surface of the wall plate 150 to produce the desired shadow effect previously described.

The wall plate of FIGS. 17 to 20 is used specifically for a double wall box mounting arrangement. It is also possible to gang any desired number of wall boxes together. An appropriate cover plate can be provided for any desired number of gangs. Thus, a triple ganged arrangement could be assembled in accordance with the present invention using three side-by-side identical adapter plates to cover the wall openings. A wall plate with three integrated openings and an appropriate number of projections which are aligned with the projection receiving slots in the various wall plates. This arrangement is snapped in place over the adapter plate and could be used for any desired number of wall box gangs.

The arrangement of FIG. 24 has been shown in connection with a switch device consisting of a dimmer having a movable operating member accessible exteriorly of the cover plate. Clearly, any type of switch or other device could be employed including diverse switches in multiple gang systems. Thus FIG. 26 shows a double ganged wall box wherein one wall box receives a toggle switch 200 for on/off operation only, while the other gang receives a dimmer of the type sold by Lutron Electronics Co., Inc., under its trademark "SKYLARK", which employs a dimmer control 201 and an on/off toggle switch 202 which can be operated independently of the dimmer control 201. Clearly, any type of switching device can be employed with the present invention in combination with identical or diverse types of switching or other devices.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. In combination, a two piece face plate and a wall box mounted device; said wall box mounted device having an attached generally thin, flat, rectangular yoke plate, said yoke plate having first and second openings therethrough located on centers which match the center-to-center spacing of threaded openings in said wall box which receive said device; said yoke plate having third and fourth openings for receiving mounting screws, said third and fourth openings being spaced on centers which match the center-to-center spacing of the mounting openings of a decorative wall plate; said two piece face plate including an adapter plate and a wall plate; said adapter plate comprising a generally thin, flat rectangular plate of length and width substantially equal to the length and width respectively of a single wall box; said adapter plate having first and second openings therein on a center-to-center spacing and with a symmetry equal to that of said third and fourth openings in said yoke plate, whereby said adapter plate can be fastened to said yoke plate in a position parallel to and juxtaposed to said yoke plate and extending across the full opening of said wall box and substantially sealing the entry to said wall box; said adapter plate further having at least first and second spaced snap connection means accessible from the surface of said adapter plate which faces away from said yoke plate; said adapter plate further having an access opening therethrough;

said wall plate comprising a generally thin, flat rectangular plate having an opening therethrough in alignment with said access opening and having an interior surface facing said adapter plate and an exterior surface opposite to said interior surface; at least first and second snap connector means extending from said interior surface of said wall plate and in alignment with said first and second snap connector means respectively of said adapter plate and operable into and out of snap connection therewith; said exterior surface of said wall plate being undisturbed by features due to plate mounting structures, the length and width of said wall plate being at least equal to the length and width of said adapter plate.

2. The combination of claim 1, wherein said yoke plate has a relatively shallow rectangular escutcheon fixed to and extending from the external side thereof; said rectangular escutcheon being generally centrally located on said face plate; said adapter plate and said wall plate each having rectangular openings which closely conform to the periphery of the sides of said escutcheon; said escutcheon having a height sufficient to extend through said adapter plate and wall plate.

3. The combination of claim 2, wherein the exterior surface of said wall plate has a chamfer around the exterior surface of said rectangular opening therethrough, thereby to minimize visual differences due to differences in the depth of penetration of said escutcheon through said rectangular opening in said wall plate.

4. The combination of claim 1, wherein said yoke plate is metal and said adapter plate and face plate are plastic.

5. The combination of claim 1, wherein said device has at least a pair of electrical terminals connectable to electrical wires in said wall box.

6. The combination of claim 5, wherein said device includes electrical wires in said wall box and an on/off switch and said electrical wires in said wall box comprise the wires of a lighting load, and said on/off switch controls said lighting load.

7. The combination of claim 5, wherein said device includes electrical wires in said wall box and a dimmer control; said electrical wires in said wall box comprise the wires of a lighting load and said dimmer control controls said lighting load.

8. The combination of claim 1, wherein said first and second holes in said yoke plate and said first and second holes in said adapter plate are disposed on a line extending symmetrically through the center of said adapter plate and are extended in a direction perpendicular to said line to enable screw connection to said wall box even in the presence of dimensional misalignment between said yoke plate and wall box.

9. The combination of claim 1, wherein said at least first and second snap connection means of said adapter plate comprise respective openings through said adapter plate, and wherein said first and second snap connector means of said wall plate comprise snap projections which enter said respective openings and make snap connection therein.

10. The combination of claim 1, which further includes a flange projecting from said interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

11. The combination of claim 1, wherein said yoke plate has a relatively shallow rectangular escutcheon fixed to and extending from one side thereof; said rectangular escutcheon being generally centrally located on said face plate; said adapter plate and said wall plate each having rectangular openings which closely conform to the periphery of the sides of said escutcheon; said escutcheon having a height sufficient to extend through said adapter plate and wall plate;

and wherein the exterior surface of said wall plate has a chamfer around the exterior surface of said rectangular opening therethrough;

and wherein said yoke plate is metal and said adapter plate and wall plate are plastic;

and wherein said device has at least a pair of electrical terminals connectable to electrical wires in said wall box;

and wherein said first and second holes in said yoke plate and said first and second holes in said adapter plate are disposed on a line extending symmetrically through the center of said adapter plate and are extended in a direction perpendicular to said line to enable screw connection to said wall box even in the presence of dimensional misalignment between said yoke plate and wall box.

12. The combination of claim 11, wherein said device includes an on/off switch.

13. The combination of claim 11, wherein said device includes a dimmer control for a lighting load.

14. The combination of claim 11, wherein said at least first and second snap connection means of said adapter plate comprise respective openings through said adapter plate, and wherein said first and second snap connector means of said face plate comprise snap projections which enter said respective openings and make snap connection therein.

15. The combination of claim 11, which further includes a flange projecting from said interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

16. The combination of claim 1, wherein said thin, flat rectangular yoke plate is permanently attached to said device.

17. The combination of claim 1, wherein said device is a switch device having a switching structure mounted adjacent said yoke plate and disposed on one side thereof; a back box fixed to said yoke plate and enclosing at least a portion of said switching structure; and a switch operating means extending from and accessible from the other side of said yoke plate and operable to operate said switching structure; said first and second openings of said yoke plate each disposed longitudinally beyond the outline of said back box; said access opening in said adapter plate permitting access to said switch operating means.

18. The combination of claim 17, wherein said thin, flat rectangular yoke plate is permanently attached to said device.

19. The combination of claim 18, wherein said yoke plate has a relatively shallow rectangular escutcheon fixed to and extending from the external side thereof; said rectangular escutcheon being generally centrally located on said face plate; said adapter plate and said wall plate each having rectangular openings which closely conform to the periphery of the sides of said escutcheon; said escutcheon having a height sufficient to extend through said adapter plate and wall plate; said switch operating means extending through said escutcheon.

20. The combination of claim 19, wherein the exterior surface of said wall plate has a chamfer around the exterior surface of said rectangular opening therethrough, thereby to minimize visual differences due to differences in the depth of penetration of said escutcheon through said rectangular opening in said wall plate.

21. The combination of claim 17, which further includes a flange projecting from said: interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

22. A two piece face plate for a conventional, NEMA conforming, wall box mounted device of the type which is mountable to a conventional, NEMA conforming, wall box and has a rectangular escutcheon extending from a metal yoke plate and a pair of spaced, conventional, NEMA conforming, threaded openings for receiving cover plate retaining screws; said two piece face plate comprising:

an adapter plate and a wall plate; said adapter plate comprising a generally thin, flat rectangular plate of length and width approximately equal to the length and width of a conventional wall box opening and having a central rectangular opening therein of dimension adapted for receiving a rectangular device escutcheon and having first and second spaced openings symmetrically located on a central line through the length of said flat rectangular plate; said adapter plate further having first snap connector means and being free of means for supporting a wall box mounted device; said wall plate comprising a generally thin, flat rectangular plate of a length and width each greater than that of said adapter plate and having a rectangular opening therethrough of length and width equal to that of said rectangular opening in said adapter plate and juxtaposed therewith; said wall plate further having second snap connector means extending from one surface thereof and in alignment with said first snap connector means of said adapter plate and operable into and out of engagement therewith; whereby said adapter plate is supportable by being connected to the wall box mounted device by screws extending through said first and second openings and engageable in said pair of threaded openings of the wall box mounted device, said adapter plate being operable to enclose the full exposed opening of the wall box.

23. The two piece face plate of claim 22, wherein said adapter plate has third and fourth laterally extended openings therethrough on the line containing said first and second openings and disposed symmetrically with said first and second openings; said third and fourth openings having a center-to-center spacing of about 2.8 inches; said third and fourth openings having respective heights at least as great as the diameter of standard mounting screws used for mounting a device in said wall box.

24. The two piece face plate of claim 23, wherein said snap connector means in said adapter plate comprises a plurality of symmetrically disposed openings therethrough, and wherein said snap connector means of said wall plate comprises a plurality of flexible projections receivable in respective ones of said openings with snap connection operation.

25. The two piece face plate of claim 24, wherein the rectangular opening in said wall plate has a chamfer on the surface facing away from said adapter plate.

26. The two piece face plate of claim 23, which further includes a flange projecting from said interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

27. The two piece face plate of claim 25, wherein said snap connector means in said adapter plate comprises a plurality of symmetrically disposed openings therethrough, and wherein said snap connector means of said wall plate comprises a plurality of flexible projections receivable in respective ones of said openings with snap connection operation.

28. The two piece face plate of claim 27, wherein the rectangular opening in said wall plate has a chamfer on the surface facing away from said adapter plate.

29. The two piece face plate of claim 22, wherein said rectangular opening in said adapter plate is aligned with said rectangular opening in said wall plate.

30. The two piece face plate of claim 22, wherein said snap connector means in said adapter plate comprises a plurality of symmetrically disposed openings therethrough, and wherein said snap connector means of said wall plate comprises a plurality of flexible projections receivable in respective ones of said openings with snap connection operation.

31. The two piece face plate of claim 22, which further includes a flange projecting from said interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

32. The two piece face plate of claim 22, wherein the rectangular opening in said wall plate has a chamfer on the surface facing away from said adapter plate.

33. The two piece face plate of claim 22, wherein each of said adapter plate and wall plate are molded plastic plates.

34. The two piece face plate of claim 22, wherein the surface of said wall plate which faces said adapter plate has first and second countersunk openings facing and aligned with said first and second openings in said adapter plate.

35. A face plate structure for a plurality of wall box mounted devices which are mounted in a multi-ganged wall box; said multi-ganged wall box forming a plurality of spaced volumes for receiving respective ones of said plurality of wall box mounted devices therein; said plurality of spaced volumes each having a respective set of first and second openings which receive mounting screws for mounting respective ones of said wall box mounted devices in said volumes; each of said wall box mounted devices having a generally thin flat rectangular yoke plate which has first and second openings therethrough on centers which match the spacing of said first and second sets of openings in said spaced volumes, and having third and fourth openings for receiving the mounting screws of a decorative wall plate; said face plate structure comprising a plurality of identical adapter plates and a single wall plate; each of said adapter plates comprising a generally thin, flat rectangular plate of length and width substantially equal to the length and width of the surface opening of any of said plurality of spaced volumes; each of said adapter plates having first and second openings therein having a center-to-center spacing and a symmetry equal to that of said third and fourth openings in any of said yoke plates, whereby each of said adapter plates can be fastened to a respective one of said plurality of volumes in a position parallel to and juxtaposed to said respective one of said yoke plates and extends across the full opening of its said respective volume and whereby each of said plurality of adapter plates abuts edge-to-edge with all adjacent adapter plates to substantially sell the full entry of said wall box; said wall plate comprising a single generally thin, flat plate having a height at least equal to the height of said adapter plates and a width equal to at least the total combined width of each of said adapter plates; and snap connection means for connecting and holding said wall plate in a covering position extending across each of said adapter plates.

36. The face plate structure of claim 35, wherein said plurality of volumes and adapter plates consists of two each.

37. The face plate structure of claim 35, wherein the exterior surface of said wall plate is undisturbed by features due to plate mounting structures.

38. The face plate structure of claim 35, wherein at least one of said adapter plates has an access opening therethrough, and wherein said wall plate has an access opening therethrough in registry with said access opening in said at least one of said adapter plates when said wall plate is connected to said adapter plates 39. The face plate structure of claim 35, wherein each of said adapter plates has an access opening therethrough and wherein said wall plate has a plurality of access openings therethrough, each in registry with a respective one of said access openings in said adapter plate when said wall plate is connected to said adapter plates 40. The face plate structure of claim 35, wherein each of said yoke plates has a relatively shallow rectangular escutcheon fixed to and extending from the external side thereof; said adapter plates and said wall plate having each of respective rectangular openings which closely conform to the periphery of the sides of respective ones of said escutcheons; each of said escutcheons having a height sufficient to extend through its respective one of said adapter plates and said wall plate.

41. The face plate structure of claim 40, wherein the exterior surface of said rectangular openings in said wall plate are chamfered at its edges, thereby to minimize visual differences due to differences in the depth of penetration of said escutcheons through said rectangular openings in said wall plate.

42. The face plate structure of claim 40, wherein said first and second holes in each of said yoke plates and said first and second holes in each of said adapter plates are disposed on a line extending symmetrically through the center of said adapter plates and are extended in a direction perpendicular to said line to enable screw connection to said wall box even in the presence of dimensional misalignment between said yoke plate and wall box.

43. The face plate structure of claim 35, which further includes a flange projecting from said interior surface of said wall plate; said flange having a height less than about one-quarter inch and being spaced from the exterior periphery of said face plate by about less than one-quarter inch, thereby to produce a shadow effect around the periphery of said face plate when said combination is mounted on a wall.

* * * * *